(12) United States Patent
Yasuda

(10) Patent No.: US 11,832,603 B2
(45) Date of Patent: Dec. 5, 2023

(54) BRAKING DEVICE, LINE LENGTH MEASURING DEVICE AND FISHING REEL EQUIPPED WITH EITHER DEVICE

(71) Applicant: GLOBERIDE, Inc., Tokyo (JP)

(72) Inventor: Hiromu Yasuda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 18/072,434

(22) Filed: Nov. 30, 2022

(65) Prior Publication Data
US 2023/0093505 A1    Mar. 23, 2023

Related U.S. Application Data

(63) Continuation of application No. 17/159,260, filed on Jan. 27, 2021, now Pat. No. 11,517,004.

(30) Foreign Application Priority Data

Mar. 24, 2020  (JP) .................. 2020-052044

(51) Int. Cl.
*A01K 89/01*   (2006.01)
*A01K 89/033*  (2006.01)
*A01K 89/015*  (2006.01)

(52) U.S. Cl.
CPC ........ *A01K 89/056* (2015.05); *A01K 89/0193* (2015.05)

(58) Field of Classification Search
CPC .......... A01K 89/003; A01K 89/011223; A01K 89/01555; A01K 89/0173; A01K 89/01929; A01K 91/20
See application file for complete search history.

(56) References Cited

U.S. PATENT DOCUMENTS

| 4,620,371 | A | * | 11/1986 | Murakami | ............. | A01K 91/20 |
| | | | | | | 33/720 |
| 4,710,689 | A | | 12/1987 | Jetsuki et al. | | |
| 5,345,691 | A | * | 9/1994 | Falk | .................... | G01B 11/043 |
| | | | | | | 43/25 |
| 5,427,323 | A | * | 6/1995 | Kaneko | .................... | G01B 3/11 |
| | | | | | | 242/223 |
| 5,503,341 | A | * | 4/1996 | Kaneko | .................. | G01B 21/06 |
| | | | | | | 242/223 |

(Continued)

FOREIGN PATENT DOCUMENTS

| CN | 1225793 A | * | 8/1999 | ........... A01K 89/015 |
| CN | 109511620 A | * | 3/2019 | ........... A01K 89/012 |

(Continued)

OTHER PUBLICATIONS

Chinese Office Action for related Chinese Application No. 202110108295.4; dated May 9, 2022; (16 pages).

(Continued)

*Primary Examiner* — Emmanuel M Marcelo

(57) ABSTRACT

I provide a braking device attachable to a body frame having one bearing member that pivotally supports a spool and an operation means for rotating the spool, including another bearing member that pivotally supports the spool; a spool brake; a control board that controls the braking force of the spool brake; a battery that supplies power to the control board; and a cover member that covers the battery and the board.

6 Claims, 2 Drawing Sheets

(56) References Cited

U.S. PATENT DOCUMENTS

| | | | | |
|---|---|---|---|---|
| 6,045,076 | A | * | 4/2000 | Daniels ............ A01K 89/01555 242/287 |
| 6,412,722 | B1 | | 7/2002 | Kreuser et al. |
| 2004/0227029 | A1 | | 11/2004 | Ikuta et al. |
| 2005/0211812 | A1 | * | 9/2005 | Nakagawa ....... A01K 89/01555 242/223 |
| 2006/0169813 | A1 | | 8/2006 | Nakagawa et al. |
| 2017/0172130 | A1 | * | 6/2017 | Komemushi ........... G01P 3/487 |
| 2017/0208789 | A1 | * | 7/2017 | Numata ............... A01K 89/033 |

FOREIGN PATENT DOCUMENTS

| | | | | |
|---|---|---|---|---|
| GB | 2517209 | A | * | 2/2015 ........... A01K 89/015 |
| JP | S62-1575 | U | | 1/1987 |
| JP | H05316906 | A | * | 12/1993 ........... A01K 89/015 |
| JP | 07036656 | U | | 7/1995 |
| JP | H11151057 | A | | 6/1999 |
| JP | H11155439 | A | * | 6/1999 ............. A01K 91/20 |
| JP | 2000004727 | A | | 1/2000 |
| JP | 2003274823 | A | | 9/2003 |
| JP | 2004357601 | A | | 12/2004 |
| JP | 2012005429 | A | | 1/2012 |
| JP | 2020080766 | A | * | 6/2020 ....... A01K 89/01555 |
| WO | WO-2016128697 | A1 | * | 8/2016 ........... A01K 89/003 |

OTHER PUBLICATIONS

Partial European Search Report for related European Application No. 21153506.7; dated Jul. 21, 2021; (14 pages).
Extended European Search Report for related European Application No. 21153506.7; dated Nov. 5, 2021; (13 pages).
Office Action for related Japanese Patent Application No. 2020-052044; dated Jan. 24, 2023; (6 pages).
Korean Office Action in connection with Korean Patent Application No. 10-2020-0163999; dated May 25, 2023; (10 pages).

* cited by examiner

BRAKING DEVICE, LINE LENGTH MEASURING DEVICE AND FISHING REEL EQUIPPED WITH EITHER DEVICE

CROSS-REFERENCE TO RELATED APPLICATIONS

The present application is a continuation application based on U.S. Ser. No. 17/159,260 filed on Jan. 27, 2021, which claims priority to Japanese Application No. 2020-052044 filed on Mar. 24, 2020, the entire contents of which are being incorporated herein by reference in their entirety.

FIELD

This disclosure relates to a braking device or a line length measuring device for a fishing reel that can prevent backlash due to excessive rotation of a spool upon casting, or that can measure the length of a fishing line upon casting, and a fishing reel equipped with either of the foregoing devices.

BACKGROUND

Conventionally, various types of fishing reels are known, including those with a built-in anti-backlash device that prevents backlash due to excessive rotation of a spool upon casting or those with a built-in line length measuring device that measures the amount of fishing line unwound from, and wound on, the spool to increase the catch.

As such fishing reels, for example, Japanese Utility Model Application Publication No. S62-001575 discloses a fishing reel including: a sensor that can detect rotation of the spool, controlling rotation of the spool by generating an eddy current to a nonmagnetic conductor that rotates in conjunction with rotation of the spool; a counter circuit that counts, with a pulse counter, the number of pulses of the signal from the sensor for each signal of the reference clock circuit; and a control means for generating an eddy current to the nonmagnetic conductor when the speed of rotation and the rotation acceleration of the spool that are calculated from the number of pulses in an arithmetic circuit reaches a value preset by a data setter.

Further, as such fishing reels, for example, Japanese Patent Application Publication No. 2003-274823 discloses a configuration of a fishing reel including: a spool rotatably supported by the reel body; a rotation speed detecting means for detecting the rotation speed of the spool; a line length measuring means for measuring the line length based on the detection results of the rotation speed detecting means; a display that displays fishing information; a receiving means for receiving data transmitted from an external transmission means that transmits fishing information; a stop means for stopping the unwinding of the fishing line; and a control means for controlling the stop means based on the bathymetric data received by the receiving means and the value measured by the line length measuring means to stop the unwinding of the fishing line at a desired depth of water.

However, in the configuration according to Japanese Utility Model Application Publication No. S62-001575, when a new function such as a display means and a communication means is added, it is necessary to review the entire existing mechanism including the power supply to provide these functions, which causes a problem that a large cost increase is inevitable.

Also, in the configuration according to Japanese Patent Application Publication No. 2003-274823, when a new function is added, it is necessary to review the mechanism of the reel body itself, which causes a problem of cost increase.

It could therefore be helpful to add a new function to an existing reel and significantly reduce the cost thereof simply by replacing the unit on the side of the reel body.

SUMMARY

I thus provide:

A braking device is attachable to a main body frame having one bearing member that pivotally supports a spool and an operation means for rotating the spool, and is configured to include: the other bearing member that pivotally supports the spool, a spool brake (spool braking unit or spool braking portion), a control board that controls the braking force of the spool brake, a battery that supplies power to the control board, and a cover member that covers the battery and the board.

The battery may be provided between the board and the other bearing member.

The battery may be a secondary battery that can be charged from an external power source, and provided with the charging terminal of the battery.

The board may be configured to have a display means that can display a set value of the braking device.

The board may be configured to have an input means that can input a set value of the braking device.

The board may have a communication means and be configured to be able to transmit rotation information of the spool to the outside.

The board may have a communication means and be configured to be able to receive configuration information of the braking device.

The braking device may be configured to be provided with a magnetic field generating means for penetrating a conductor provided on the spool, and a magnetic field adjusting means for adjusting the magnetic field of the magnetic field generating means.

The braking device may be configured to be provided with a coil facing a magnet provided on the spool.

A fishing reel may be configured to have these braking devices.

A line length measuring device is attachable to a main body frame having one bearing member that pivotally supports a spool, and an operation means for rotating the spool, and is configured to include: the other bearing member that pivotally supports the spool, a spool rotation detector (spool rotation detecting unit or spool rotation detecting portion), a control board that calculates a line length based on information detected by the spool rotation detector, a battery that supplies power to the control board, and a cover member that covers the battery and the board.

It thus is possible to add a new function to an existing reel and to significantly reduce the cost thereof simply by replacing the unit on the side of the reel body.

DESCRIPTION OF THE NUMERICAL REFERENCES

Figure 1:
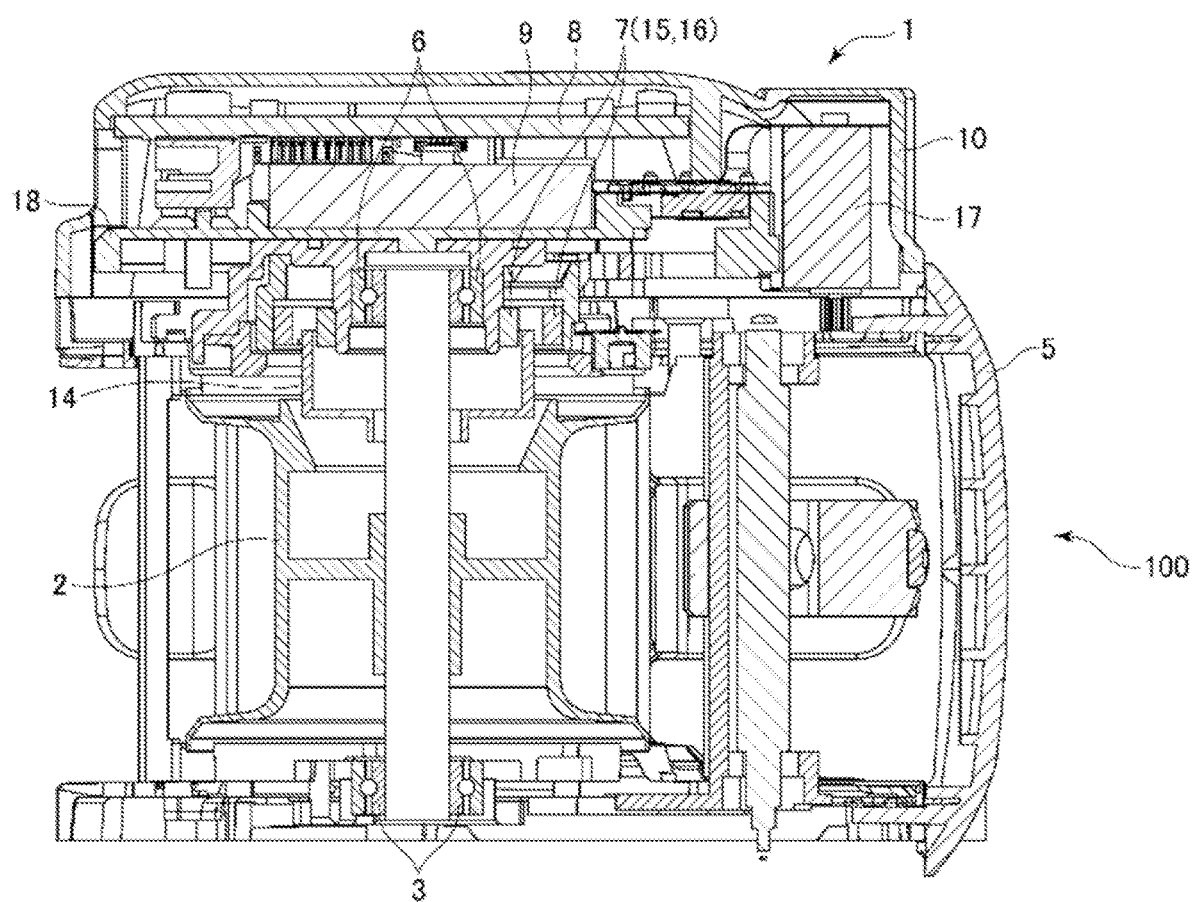
FIG. 1 shows a schematic diagram illustrating a braking device and a fishing reel according to an example.

1 Braking device
2 Spool

3 One bearing member
5 Main body frame
6 The other bearing member
7 Spool brake
8 Control board
9 Battery
10 Cover member
11 Display means
12 Input means
13 Communication means
14 Conductor
15 Magnetic field generating means
16 Magnetic field adjusting means
17 Motor
18 Lid member
19 Set plate
20 Gear train
100 Fishing reel

DETAILED DESCRIPTION

Hereinafter, examples of a locking device will be described in detail with reference to the accompanying drawings. Components common in the plurality of drawings are denoted by the same reference numerals through the plurality of drawings. Each of the drawings is not necessarily scaled for convenience of explanation.

First, the braking device 1 will be described with reference to FIGS. 1 and 2. As illustrated, the braking device 1 is attachable to a main body frame 5 having one bearing member 3 that pivotally supports a spool 2 and an operation means (not illustrated) that rotates the spool 2, and is configured to include: the other bearing member 6 that pivotally supports the spool 2; a spool brake 7; a control board 8 that controls the braking force of the spool brake 7; a battery 9 that supplies power to the control board 8; and a cover member 10 that covers the battery 9 and the board 8.

It is possible to add a new function to an existing reel and to significantly reduce the cost thereof simply by replacing the unit on the side of the reel body.

Figure 2:
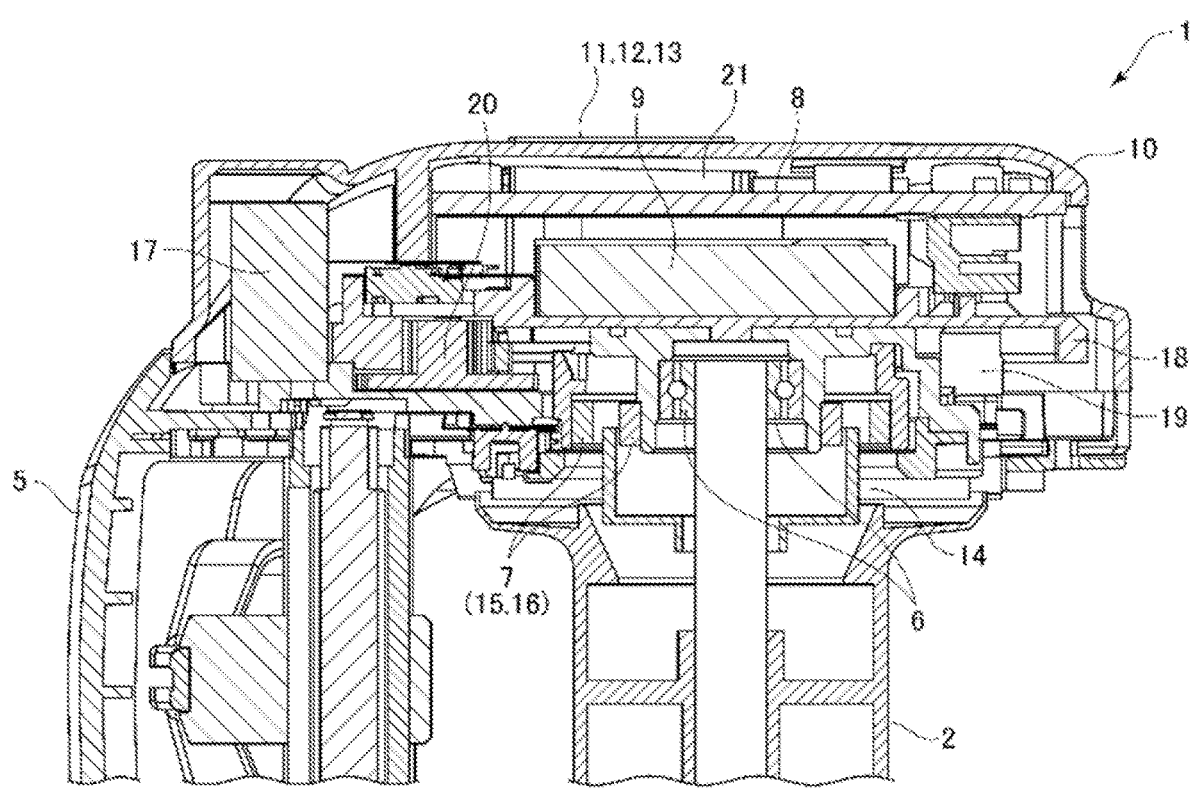
FIG. 2 shows a schematic diagram illustrating a braking device according to an example.

As shown in FIGS. 1 and 2, the spool brake 7 of the braking device 1 has a motor 17, the motor 17, which is surrounded by a lid member 18 and the cover member 10, is supported by the lid member 18, and the driving force of the motor 17 is connected to a braking means 21 via a gear train 20 disposed on a set plate 19. In this way, it is possible to reliably perform the braking of the spool 2 by changing the relative position of the braking means with respect to the conductor described later. However, further details are not provided.

As shown in FIGS. 1 and 2, in the braking device 1, the battery 9 is provided between the board 8 and the other bearing member 6, which makes it possible to dispose the board 8 on the side of the cover member 10. It is possible to arrange, on the board, LED and LCD, external output components such as speakers, input components such as operation buttons, and electrical components such as communication terminals and charging terminals. These electrical components need to be disposed on the outer surface side of a device to allow direct operation or viewing by users. Compared to the method of wiring these electrical components with lead wires, flexible cables and the like, the above layout allows an arrangement with reduction in overall size and cost.

The battery 9 may be a secondary battery that can be charged from an external power source. In this configuration, the charging terminal of the battery may be provided on the board 8 whereby it will no longer be necessary to replace the battery 9. This carries technical advantages that it is possible to place the battery 9 inside, a lid or the like of the cover member 10 is not required to replace a battery, and it is easier to waterproof the battery 9 without increase in size. Further, placing the battery 9 between the board 8 and the bearing member 6 provides technical advantages that it is easier to place a large-volume battery without increasing the dead space, improve battery life and increase the current capacity.

Further, as shown in FIG. 2, in the braking device 1, the board 8 is configured to have a display means 11 that can display a set value of the braking device 1. At this time, it is possible to drill a through hole in a portion of the cover member 10 or use a highly transparent material, as necessary, which makes it possible to easily add a display function to the braking device.

The board 8 is configured to have an input means 12 that can input a set value of the braking device 1, which makes it possible to easily add an input function to the braking device.

The board 8 has a communication means 13, and is configured to be able to transmit rotation information of the spool 2 to the outside, which makes it possible to easily add a transmission function to the braking device.

The board 8 has the communication means 13 and is configured to be able to receive configuration information of the braking device 1, which makes it possible to easily add a receiving function to the braking device.

The braking device 1 may be configured to be provided with a magnetic field generating means 15 that penetrates a conductor 14 provided on the spool 2, and a magnetic field adjusting means 16 that electronically adjusts the magnetic field of the magnetic field generating means. Thus, attaching the braking device to the side of the reel body makes it possible to easily perform the braking of the spool electronically at low cost. Further, when the battery of the reel to which the braking device is attached is exhausted, or when the characteristics of the braking device need to be changed, it can be replaced with another unit having the braking device. Thus, fishing can be continued without replacing the spool, the fishing line, and the fishing rod.

The braking device 1 may be configured to be provided with a coil that faces a magnet provided on the spool 2.

Although not illustrated, a line length measuring device is attachable to a main body frame having one bearing member that pivotally supports a spool and an operation means that rotates the spool 2, and may be configured to include the other bearing member that pivotally supports the spool, a spool rotation detector, a control board that calculates a line length based on information detected by the spool rotation detector, a battery that supplies power to the control board, and a cover member that covers the battery and the board.

In the line length measuring device, it is possible to add a new function to an existing reel and to significantly reduce the cost thereof simply by replacing the unit on the side of the reel body.

The fishing reel 100 is configured to include the main body frame 5 and the braking device 1 attached to the main body frame 5.

In the fishing reel 100 having a braking device 1, it is possible to add a new function to an existing reel, and to significantly reduce the cost thereof simply by replacing the unit on the side of a reel body 5.

The dimension, material and arrangement of each component described herein are not limited to those explicitly described in the examples, and each component can be modified to have any dimension, material and arrangement that may be within the scope of this disclosure. Further, components not explicitly described herein may be added to the described examples, or some of the components described in each example may also be omitted.

What is claimed is:

1. A line length measuring device replaceably attachable to a body frame of a fishing reel, the body frame having a first bearing member that pivotally supports a spool and an operation unit for rotating the spool, the line length measuring device comprising:
    a second bearing member that is arranged to pivotally support the spool;
    a spool rotation detector;
    a control board configured to calculate a line length based on information detected by the spool rotation detector;
    a battery configured to supply power to the control board; and
    a cover member that covers the battery and the control board,
    wherein the battery is disposed between the control board and the second bearing member.

2. The line length measuring device according to claim 1, wherein the battery is a secondary battery configured to be charged from an external power source, and provided with a charging terminal of the battery.

3. A fishing reel comprising the line length measuring device according to claim 2.

4. The line length measuring device according to claim 1, wherein the control board has a communication unit and is configured to transmit rotation information of the spool to outside.

5. A fishing reel comprising the line length measuring device according to claim 4.

6. A fishing reel comprising the line length measuring device according to claim 1.

* * * * *